(12) United States Patent
Lewis et al.

(10) Patent No.: US 10,372,291 B1
(45) Date of Patent: Aug. 6, 2019

(54) SYSTEMS AND METHODS FOR CLICK-TO-CALLBACK

(71) Applicant: United Services Automobile Association (USAA), San Antonio, TX (US)

(72) Inventors: Gregory N. Lewis, Boerne, TX (US); Bradly J. Billman, San Antonio, TX (US); Kevin A. Kossow, Boerne, TX (US); Nataraj Davalath, San Antonio, TX (US); Andre R. Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 894 days.

(21) Appl. No.: 13/693,606

(22) Filed: Dec. 4, 2012

Related U.S. Application Data

(63) Continuation of application No. 11/842,498, filed on Aug. 21, 2007, now Pat. No. 8,413,058.

(51) Int. Cl.
*G06F 3/0481* (2013.01)
*G06F 3/0482* (2013.01)
*G06F 3/0488* (2013.01)
*G06F 3/0489* (2013.01)

(52) U.S. Cl.
CPC ................ *G06F 3/04817* (2013.01)

(58) Field of Classification Search
CPC .... G06F 3/0481; G06F 3/0482; G06F 3/0483; G06F 3/04817; G06F 9/4443; H04N 5/44543
USPC .......................... 715/810, 764, 835
See application file for complete search history.

(56) References Cited

U.S. PATENT DOCUMENTS

| | | | | |
|---|---|---|---|---|
| 5,311,583 | A | * | 5/1994 | Friedes ............... H04M 3/4228 379/207.03 |
| 5,696,809 | A | | 12/1997 | Voit |
| 5,966,652 | A | * | 10/1999 | Coad ................. H04M 1/27455 455/412.1 |
| 6,473,494 | B1 | * | 10/2002 | Carrera ............. H04M 1/72502 379/67.1 |
| 6,493,447 | B1 | | 12/2002 | Goss et al. |

(Continued)

OTHER PUBLICATIONS

Beal, Vangie; E-Commerce-Guide.com "Chatting Your Way to Success with Live Support," pp. 1-6, Novia Scotia, D Canada. Aug. 14, 2007.

(Continued)

*Primary Examiner* — Kevin L Young
*Assistant Examiner* — Erik V Stitt
(74) *Attorney, Agent, or Firm* — Fish & Richardson P.C.

(57) ABSTRACT

Click-to-callback provides an icon or link on a webpage that a user can select or click on. When the icon or link is clicked or otherwise selected, the user is provided with a list of his phone numbers to choose from, or a blank field to enter an alternate number, for an immediate return call from a representative of the entity (e.g., the company) associated with the webpage. When this request is submitted, the representative desirably calls the user back immediately (e.g., within about 10 seconds) to provide assistance. Thus, the user remains on the website, and gets the help he desires to continue on the website, which may, for example, lead to the user making an online purchase.

18 Claims, 6 Drawing Sheets

(56) References Cited

U.S. PATENT DOCUMENTS

| | | | |
|---|---|---|---|
| 6,513,060 B1* | 1/2003 | Nixon | H04L 41/0681 709/203 |
| 6,606,647 B2 | 8/2003 | Shah et al. | |
| 6,651,085 B1* | 11/2003 | Woods | H04M 3/51 709/203 |
| 6,654,815 B1 | 11/2003 | Goss et al. | |
| 6,731,625 B1* | 5/2004 | Eastep | H04L 29/06 370/352 |
| 6,771,760 B1 | 8/2004 | Vortman et al. | |
| 6,792,102 B2* | 9/2004 | Shires | H04M 3/5191 379/265.04 |
| 6,879,683 B1 | 4/2005 | Fain et al. | |
| 7,117,445 B2 | 10/2006 | Berger | |
| 7,145,998 B1 | 12/2006 | Holder et al. | |
| 7,274,787 B1* | 9/2007 | Schoeneberger | H04M 3/5231 379/265.01 |
| 7,315,518 B1 | 1/2008 | Siegrist | |
| 7,564,962 B1* | 7/2009 | O'Keeffe | H04M 3/5191 370/401 |
| 7,761,323 B2* | 7/2010 | Rafter | G06Q 10/00 705/7.16 |
| 8,102,986 B1* | 1/2012 | McClintock | H04M 3/537 370/352 |
| 8,107,609 B2 | 1/2012 | Trandal et al. | |
| 8,325,897 B1* | 12/2012 | McClintock | H04M 3/537 370/352 |
| 8,401,163 B1* | 3/2013 | Kirchhoff | H04L 29/06197 370/356 |
| 8,413,058 B1* | 4/2013 | Lewis | H04M 7/003 715/700 |
| 8,781,092 B2* | 7/2014 | Noble, Jr. | H04M 3/5231 379/209.01 |
| 2002/0010616 A1* | 1/2002 | Itzhaki | G06Q 30/02 709/227 |
| 2002/0055967 A1* | 5/2002 | Coussement | H04L 41/028 709/202 |
| 2002/0165784 A1* | 11/2002 | Taggart | G06F 8/61 705/26.41 |
| 2003/0130864 A1 | 7/2003 | Ho et al. | |
| 2003/0223571 A1 | 12/2003 | Dezonno | |
| 2004/0039846 A1* | 2/2004 | Goss | H04L 29/06 709/248 |
| 2004/0268265 A1 | 12/2004 | Berger | |
| 2006/0002538 A1 | 1/2006 | Dezonno | |
| 2006/0018441 A1 | 1/2006 | Timmins et al. | |
| 2006/0126806 A1* | 6/2006 | Trandal | H04M 1/663 379/88.26 |
| 2006/0256949 A1* | 11/2006 | Noble, Jr. | H04M 3/5231 379/265.01 |
| 2006/0262922 A1 | 11/2006 | Margulies et al. | |
| 2007/0025542 A1* | 2/2007 | Bushey | H04M 3/5166 379/265.02 |
| 2007/0088701 A1 | 4/2007 | Rao | |
| 2007/0121874 A1 | 5/2007 | Holder et al. | |
| 2007/0162334 A1* | 7/2007 | Altberg | G06Q 30/02 705/14.68 |
| 2007/0201659 A1 | 8/2007 | Altberg et al. | |
| 2007/0233291 A1* | 10/2007 | Herde | G06Q 10/02 700/91 |
| 2008/0120719 A1* | 5/2008 | Doug | G06F 21/42 726/22 |
| 2008/0175174 A1 | 7/2008 | Altberg et al. | |
| 2008/0276183 A1* | 11/2008 | Siegrist | G06F 9/45512 715/748 |
| 2008/0310604 A1 | 12/2008 | Agarwal et al. | |
| 2010/0250357 A1* | 9/2010 | Kim | G06Q 30/02 705/14.23 |
| 2012/0311018 A1* | 12/2012 | Jin | G06Q 30/06 709/202 |

OTHER PUBLICATIONS

Bernett, Howard G.; Jaramillo, Melissa L. "Mitretek's Internet Protocol Call Center Laboratory," pp. 83-90. Aug. 21, 2007.

LivePerson Pro: "Live Chat Software, Live Support, Chat Software, Live Chat by LivePerson," Website pp. 1-2, Aug. 14, 2007.

Estara, "PCMag.com launches Click to Call Powered by eStara", New York, NY & Reston, VA, Dec. 5, 2006, pp. 1-3, Copyright 1999-2007.

Mehortra, Vijay, "Ringing Up Big Business", Institute for Operations Research and the Management Sciences, OR/MS Today, Aug. 1997, pp. 1-10, Copyright 1997.

Brown, Donald E. "The Interaction Center Platform (TM)—White Paper", Interactive Intelligence, pp. 1-35, Indianapolis, IN 46278, Copyright 1994-2005.

Bernett, Howard G. "Federal Call Centers: A Usage and Technology Update", Mitretek Systems, The Telecommunications Review, 2004, pp. 1-6.

* cited by examiner

SYSTEMS AND METHODS FOR CLICK-TO-CALLBACK

CROSS-REFERENCE TO RELATED APPLICATIONS

This application is a continuation application of U.S. patent application Ser. No. 11/842,498, filed Aug. 21, 2007, and is related by subject matter to the subject matter disclosed in the following commonly assigned applications, the entirety of which are hereby incorporated by reference herein: U.S. patent application Ser. No. 11/842,546, filed Aug. 21, 2007, U.S. patent application Ser. No. 11/842,576, filed Aug. 21, 2007, and U.S. patent application Ser. No. 11/842,605, filed Aug. 21, 2007.

BACKGROUND

When a user visits a company's website, he often reaches a point where he has a question, or needs assistance or further information immediately, e.g., before making a purchase of goods or services. The user often leaves the website at that point, without making the purchase, and may or may not call the company or website sponsor or owner later for help.

Additionally, a user may begin a transaction to make a purchase from a company on a website, and may decide to cancel out of the transaction. Often, the user is presented with a message like "You are about to cancel your transaction. Your information will not be saved. For help with this transaction or to continue by phone, call us toll-free at 1-800-555-1234." It is unlikely that the user will respond to this type of message. In some cases, the user may not even receive a message. This is a missed opportunity for the company to increase the likelihood of making an online sale.

SUMMARY

Click-to-callback provides an icon or link on a webpage that a user can select or click on. When the icon or link is clicked or otherwise selected, the user is provided with a list of his previously stored phone numbers to choose from, or a blank field to enter an alternate number, for an immediate return call from a representative of the entity (e.g., the company) associated with the webpage. When this request is submitted, the representative desirably calls the user back immediately (e.g., within 10 seconds) to provide assistance to the user. Thus, the user remains on the company's website, and gets the help he needs to continue on the website, which may, for example, lead to the user making an online purchase.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION

Figure 1:
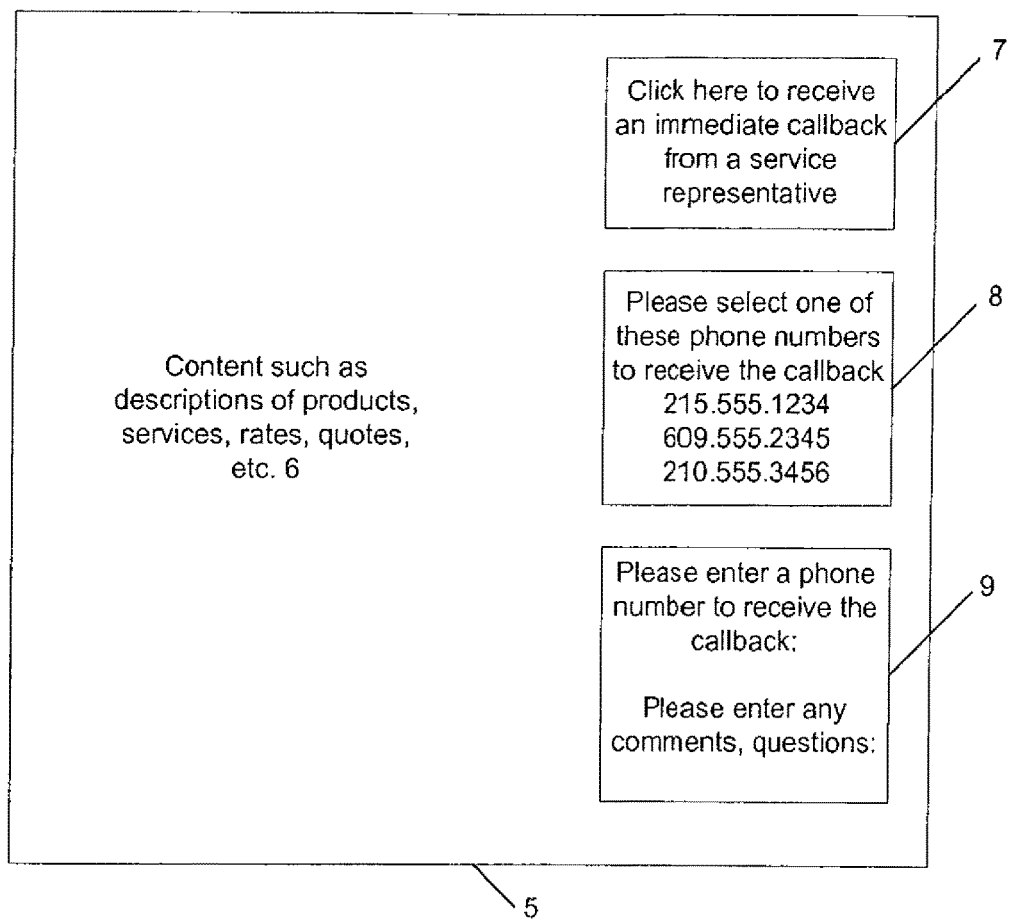
FIG. 1 is a diagram of an example page of content having an example callback icon.

A user when visiting a page of content, such as a website or webpage, for example shown in FIG. 1, may click an icon 7, a link, or other selectable item such as a button or menu item (collectively referred to herein as an icon), that is displayed on the page 5 along with other content 6 on the page 5, to request an immediate callback (e.g., within about 10 seconds) from a representative at the entity (e.g., a company or other entity, collectively referred to herein as a company) associated with the website or page. After the user clicks the icon or link 7, for example, previously stored phone numbers associated with the user are displayed in a window 8, and the user may select one of the numbers to be called back on. Alternately, the user may enter a number in a window 9 on which to receive the callback. The user may also input comments or questions in the window 9, for example, that desirably will be provided to the representative ahead of the callback. The arrangement of icons, data, and windows shown in FIG. 1 is exemplary only, and any suitable arrangement may be used.

When the request for a callback is submitted, a representative of the company calls the user back with help, desirably immediately, using the number the user selected or entered. In this manner, the user remains on the website and receives the assistance he desires, and is more likely, for example, to complete the transaction.

Figure 2:
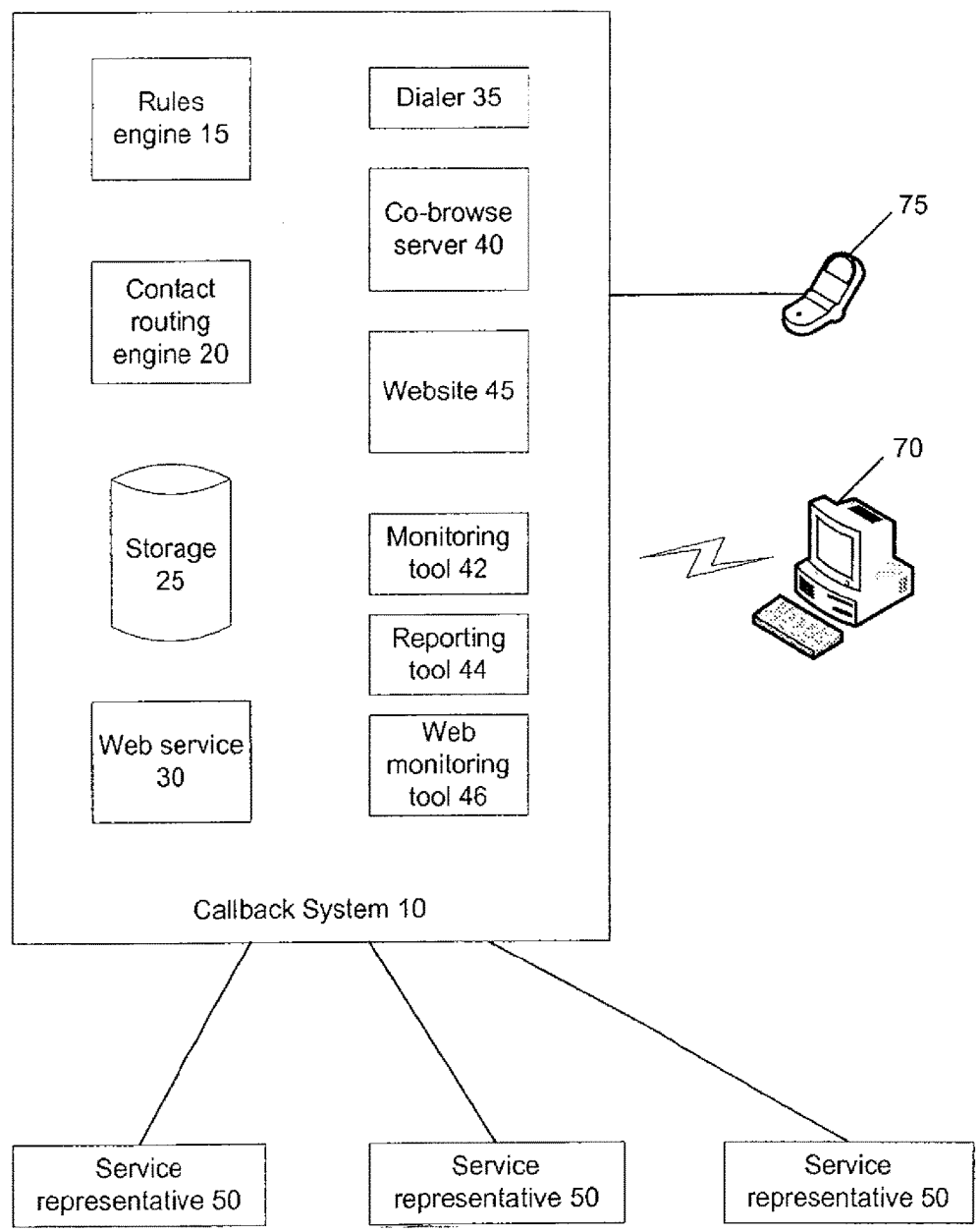
FIG. 2 is a block diagram of an example callback system.

FIG. 2 is a block diagram of an example callback system. The example callback system 10 may be associated with a company, such as a financial services company, and desirably comprises a rules engine 15, a contact routing engine 20, storage 25, a web service 30, a dialer 35, and a co-browse server 40. The system 10 also has a website 45 or other presence on the Internet that may be accessed by a user via a user computing device 70. Although only one user computing device 70 is shown in FIG. 1, it is contemplated that any number of user computing devices may be in communication with the callback system 10. An example user computing device is described with respect to FIG. 6.

Service representatives 50 associated with the company are also shown, and are desirably in contact with the system 10 via the contact routing engine 20. It is contemplated that any number of service representatives 50 may be associated with the company.

The rules engine 15 desirably comprises, maintains, and/or analyzes rules, conditions, and circumstances to determine whether to display the callback icon on the webpage. The rules may be stored in storage associated with the rules engine 15, such as the storage 25 or other storage. The storage 25 may also be used to store user information, phone numbers, contextual information, and customer entered contextual information, described further herein. The storage 25, for example, may comprise a database.

The contact routing engine 20 may be used to determine whether a service representative is available to callback the user at a user phone 75, and may also be used to determine which service representative is available. These and other components of the example callback system 10 are described further herein, and may be implemented in a computing device or environment, such as that described with respect to FIG. 6, for example. Additionally, software modules may be used in the performance of the example techniques described herein.

Figure 3:
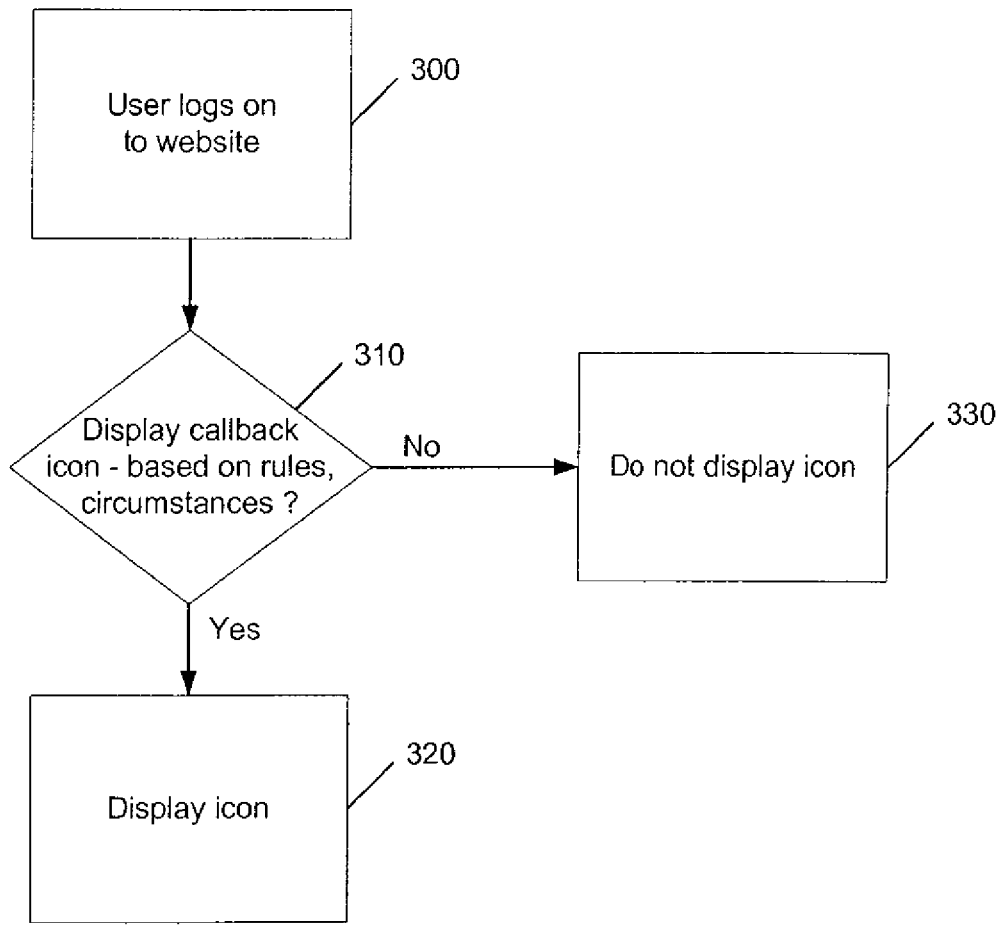
FIG. 3 is a flow diagram representing various aspects of an example callback method.
Figure 4:
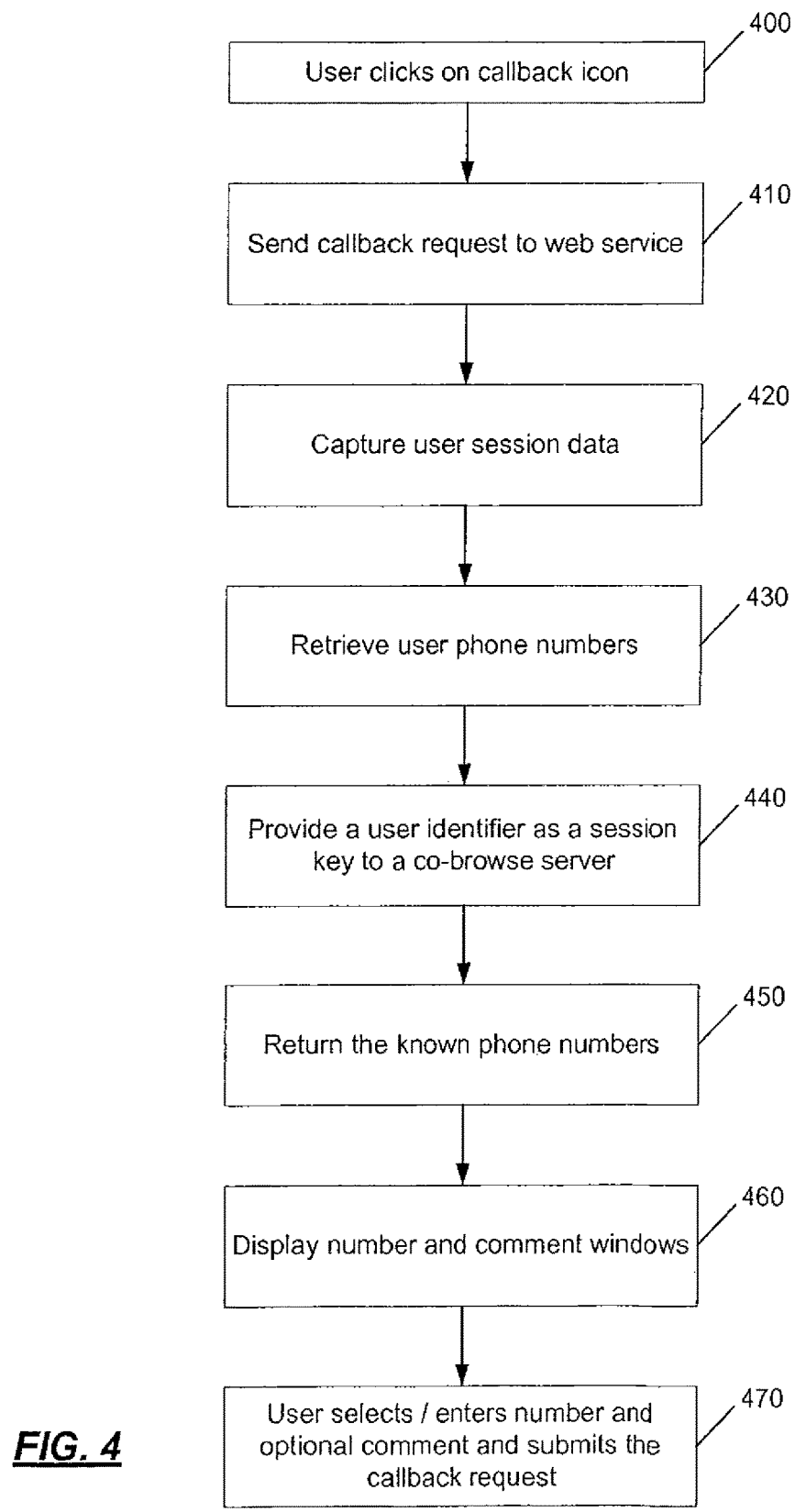
FIG. 4 is a flow diagram representing additional aspects of an example callback method.
Figure 5:
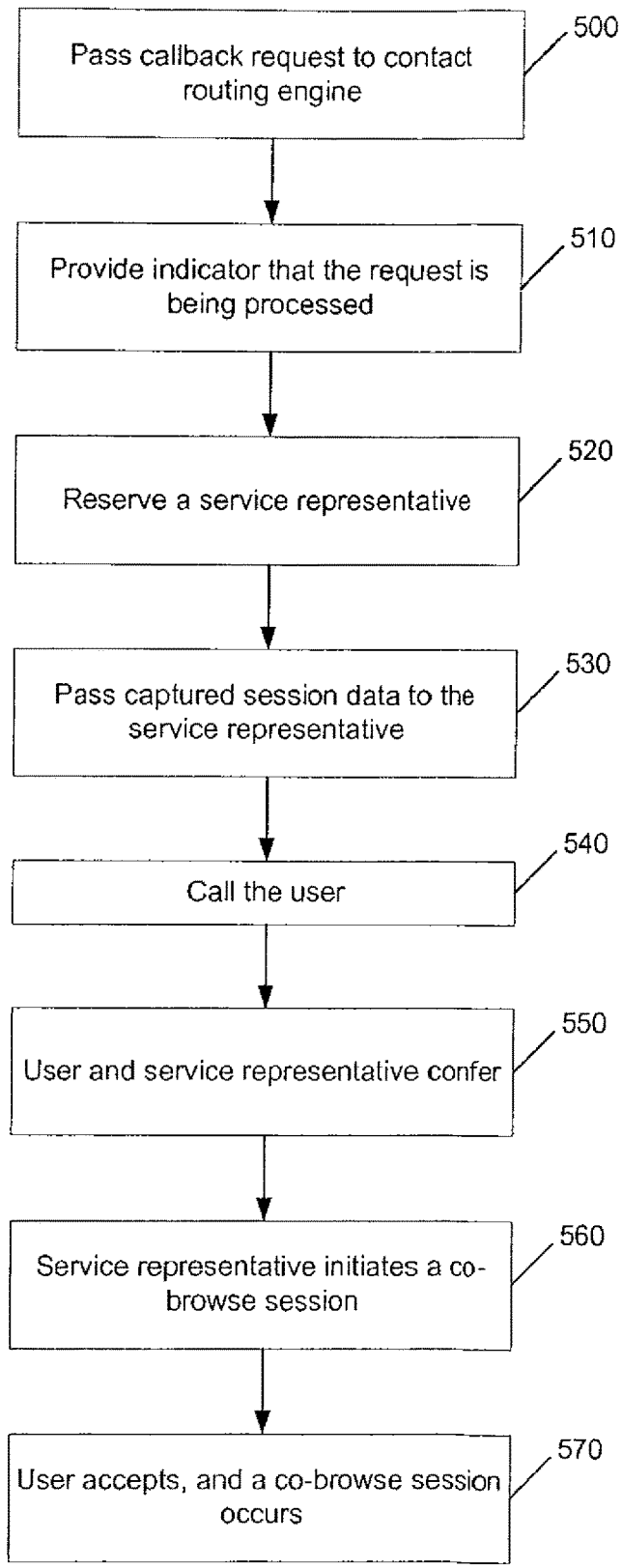
FIG. 5 is a flow diagram representing additional aspects of an example callback method.

FIGS. 3-5 are flow diagrams representing various aspects of an example callback method. A user on a website, such as a member, customer, or prospective member or customer, visits or logs onto a website or page 45, at step 300.

It is then determined whether an icon 7 should be displayed, e.g., in a corner of the page display, at step 310, that is directed to a callback request. Desirably, the icon is displayed only under certain circumstances or business rules, as determined by the rules engine 15. This set of one or more predetermined circumstances and/or rules is checked at step 310.

Example circumstances and rules include showing the link if the user has logged into the site (as opposed to being a guest), if the user is a registered user, if the user has been on the page or a particular section of the website for at least a predetermined amount of time, if a service representative is available to call the user back, and/or contextual information (e.g., the page the user is on, the content he is looking at, etc.). For example, a check is made with the contact routing engine 20 to determine if a service representative is available and to determine if a previously assisting service representative (e.g., who worked with the user previously) is available for further assistance.

Thus, for a subsequent user callback request, the user may be presented with the identifier of a representative who assisted him in the past, and can request that that particular representative call him back, e.g., either immediately or at a later time. Desirably, if a service representative is available (regardless of whether the available service representative has assisted the user in the past), then the icon is displayed.

Other example circumstances and rules dictate if the link can be shown based on various characteristics or demographics of the user, time and day of week, and location of the user (e.g., state or time zone), for example. Thus, for example, the icon is displayed if a service representative is available and the predetermined circumstances and rules allow it, or is not displayed if a service representative is not available or the other circumstances or rules prevent it.

According to an embodiment, if it is determined that service representatives are too busy to immediately callback (e.g., estimated callback time will be greater than about 10 minutes, a callback queue has at least five users waiting to receive callbacks, etc.), then the callback icon is desirably not provided to the user. This determination may be based on call queue depth and average wait time, for example.

Optionally, if click-to-callback is not immediately available, it may be desirable to prompt the user anyway with the icon, and if the user selects the icon, the user may be notified that an immediate callback is not available, but a callback will be made at some point in the future (at a user selectable time, for example, or as soon as a service representative is available). Desirably, the user information and contextual information will be saved (e.g., in the storage 25) and ultimately provided to the service representative, so that the service representative who calls the user back later knows what the user was working on. Alternatively, the callback request may be sent to a less appropriate (less skilled, for example) service representative for quicker, desirably immediate, handling.

It is contemplated that various weights may be assigned to various factors, conditions, circumstances, and/or rules, and the rules engine 15 takes these weights into account when determining whether or not an icon should be displayed. For example, whether or not a user is registered may be assigned a weight of 2, and whether or not a service representative is available may be assigned a weight of 10. The rules engine may then add the various weights based on the check of the various factors, conditions, circumstances, and/or rules, and determine whether or not to display the icon.

For example, assume the user is registered (+2) and a service representative is available (+10). If the predetermined threshold for displaying an icon is set to 11, then the icon will be displayed, because the addition of the results of the weights of the two rules add to 12 (2+10). However, if the user is not registered (0), and the service representative is available (+10), if the threshold for displaying an icon is set to 11, then the icon will not be displayed because the results only add to 10 (0+10). The example addition of weights techniques is just one example, and it is contemplated that many types of weighting factors, algorithms, techniques, and thresholds may be used in the determination as to whether or not to display a callback icon on a webpage.

Based on the results of the check of the predetermined circumstances, the icon is displayed (e.g., rendered) at step 320, or not displayed at step 330. If the icon is not displayed, an alert may be sent to the company, logged, or otherwise stored along with the circumstances, so the company can monitor its users and the circumstances, and/or determine if there is an internal problem (e.g., no service representatives available during a busy time), for example. If the icon is not displayed, then the process desirably exits and the user may still use the webpage, but without the display of a callback request icon.

If the check of the predetermined circumstances and rules results in the icon being displayed, then the icon may be displayed with a name of a service representative and a message, for example, that states "Click to speak with a service representative (name of service representative) now". If the previous assisting service representative is available (e.g., by checking the storage that contains user information and service representative history, etc.), the message displayed with the icon may display the name of the service representative and a message that states "Click to speak with (name of service representative) now", for example. If the previously assisting service representative is not available, the message may state "Click to receive a callback now", for example.

In some example embodiments, a contact routing engine 20 may be eliminated or not used. In such embodiments, a determination may not be made as to whether there is a service representative available for a callback. A display of an icon on a webpage thus will not be premised on the availability or unavailability of a service representative. As long as the other circumstances and rules pertaining to displaying a callback icon are met or result in a determination that a callback icon should be displayed, a callback icon will desirably be displayed. If a callback request is then made by a user by selecting the icon, the call will desirably be routed to a service representative, regardless of the service representative availability. If a service representative is not immediately available, the user may be placed in a callback queue and appropriately notified of the queue and perhaps a prospective wait time. Optionally, the user may receive a callback at a later time.

A user may be moved up in the callback queue, depending on, for example, the user's membership level (e.g., based on activity level, or level he purchased), whether the user is a new member, where the user is on the website (e.g., if he is pages or steps deep into an activity or purchase), and how long the user has been on the website. Other factors may also be considered.

At some point, if the icon is being displayed, the user may select or click on the icon to request a callback, at step 400 of FIG. 4. This request is sent to a web service 30 for a callback, at step 410. The web service desirably captures the user session data (e.g., contextual information, such as user identifier, webpage clicked from, additional session information, etc.), at step 420. At step 430, the web service makes a call to storage, such as a central user information database associated with the storage 25, for a data lookup to retrieve the user's previously stored phone numbers (e.g., gathered from a user's earlier purchase, membership or registration information, or public sources such as online telephone listings or books). At step 440, the web service passes a user identifier as a session key to the co-browse server 40.

At step 450, the request returns the known phone numbers, if any, that are maintained in storage (or captured in real-time, e.g., from an online data source) for that user, to the web service for use in a "number selection" window (e.g., window 8 in FIG. 1). The "number selection" window may then be presented, at step 460, to the user with the known phone numbers pre-filled with appropriate labels (e.g., home, mobile phone), a blank "other" number field and a text field (e.g., window 9 in FIG. 1) for a brief explanation of the reason for the desired callback, such as a customer entered context that allows a user to enter text to provide a brief explanation, comment, or question, for example. The user may then select the desired return number, or enter a separate number in the "other" box, and clicks "submit", for example, at step 470.

For example, when the member clicks the callback icon, a request is sent to a servlet that makes a lookup call to a user data database, with the returning phone numbers being passed back and displayed in a "number selection" window being presented to the user, along with a blank field for the user to enter an alternate number.

Desirably, specific customer information may then be captured and sent to the appropriate service representative who may then callback the user. For example, contextual information from the page the user is on is captured and analyzed, so that the request for callback may be sent to the most appropriate service representative or service group of representatives available.

As noted above, when selecting the phone number to be called on, a window or box is also displayed to the user for entering a question or comment (i.e., customer entered context) that will be provided to the service representative who will be calling the user back. In this manner, the service representative will have this question or comment in front of him when speaking with the user, and be better equipped to provide service or assistance to the user.

Once the "Submit" button has been pressed, the web service passes the request to the contact routing engine, at step 500, as shown in FIG. 5. Once passed, the web service presents a window or message to the user, at step 510, that indicates to the user, or notifies the user, that the request is being processed and a callback will be made shortly to the requesting user. This window desirably will also display any status or error conditions that are produced during the callback request. Additionally, a phone number may be provided to the user to call if he does not receive the callback. The user may also be requested to leave a co-browse window open while the company contacts the user.

Then, at step 520, the contact routing engine desirably reserves a service representative, either a previously assisting service representative if available or another appropriate available service representative, and passes the captured session data (e.g., phone number, page clicked from, user identifier, contextual information, customer entered context) to the service representative with a user data or portal screen, at step 530, before dialing the user, at step 540. Desirably, determination of the service representative is queue and skill specific, so the request is routed to the most appropriate and available service representative.

Once the service representative is reserved and the data is passed, the callback request is desirably placed in the telephony or outbound dialer 35 for callback. For example, a servlet may insert a call record into a dialer table which then dials the user immediately. The user may then be dialed for requested callback, and the service representative and user may engage in a phone conversation, at step 550. Desirably, redundancy is provided so that if the automatic dialer is down, and the user is expecting a call, a representative will be notified and the call to the user may be placed manually.

Optionally, the service representative designated to place the callback may receive a notification about the number of users who are waiting to speak with him. In this way, the representative can finish his current call quickly, and reduce the queue.

Once on the phone with the user, the service representative may assist the user and may find it desirable to join the user's online (e.g., Internet) session to assist with issues and, for example, to discuss other services and products (e.g., the user calls about an auto policy, but banking accounts, credit cards, rental and home owners insurance, for example, may be discussed). The service representative can initiate a co-browse, e.g., by clicking on a link. The service representative and user can co-browse and talk on the telephone simultaneously. The service representative may offer to join the session with the user, and if acceptable to the user, the service representative starts a co-browse service with the user's identifier used as the key for the co-browse session, at step 560. When the user selects the phone number he wants to be called back on and submits it, the user identifier may be passed as a co-browse key to a co-browse server. The user clicks an "accept" or similar button, for example, and a co-browse session may be started for both the service representative and the user at step 570.

It is contemplated that a user may access the website or page from a mobile device such as a cell phone or other phone enabled mobile device, and receive the option to request a callback at their mobile device. In such an example, co-browse may not be provided.

Monitoring and reporting may also be provided. For example, as shown in FIG. 2, an example monitoring tool 42 may monitor the call status for each callback requested to report the status of call attempts (via the dialer, for example) and web service operation (successful passing of a request to the contact routing engine and returned values to the user facing screens). An example reporting tool 44 may use the dialer information and callback requests to produce a report based on call volumes daily, weekly and monthly, pages being clicked from, and call volume by state or other location, for example. An example web monitoring tool 46 may monitor the "page clicked from" values being passed from the web service. If a pattern is detected (such as a predetermined pattern) that indicates an outage or other potential issue, a warning may be sent to check the website for an outage or other issue.

According to an example embodiment, when a user is canceling out of an application to make an online purchase (e.g., via the Internet), a callback icon is displayed. In this manner, instead of, or after, canceling out of the purchase application, a user may request a callback from a service representative, either immediately or at a predetermined time in the future, if immediately is not desirable or convenient to the user. The representative may then assist the user in completing the purchase application, from where on the page or application the user was attempting to cancel out, or had already canceled out.

A user incentive may be provided in addition to the callback. For example, if a user who has canceled out of a purchase, or is attempting to cancel, a callback icon may be displayed along with an offer, such as "get 5% off if you buy using the callback icon". In this manner, a user may be persuaded to make a purchase, or request a callback from a service representative who may then provide the assistance the user needs in order to make a purchase.

According to another embodiment, the callback icon may also appear on error pages, so the company, website operator, or other entity, may identify a problem, e.g., if there is a concentration of calls from that page. Or a user can call and notify the company of the error page. In this manner, the user provides some webpage or process error detection.

Exemplary Computing Arrangement

Figure 6:
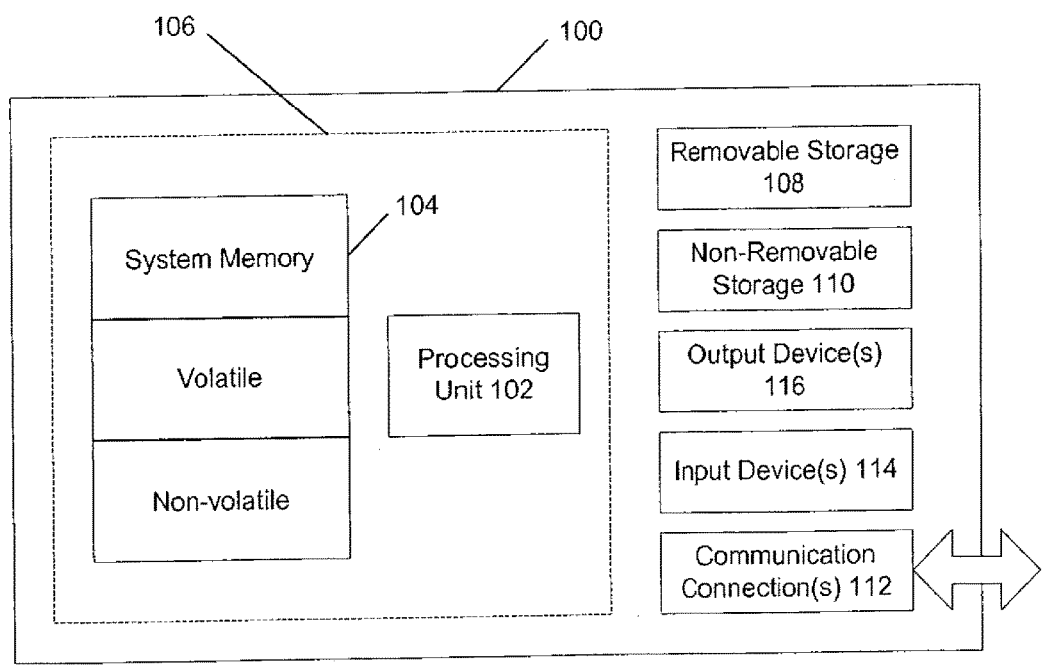
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality. Neither should the computing environment be interpreted as having any dependency or requirement relating to anyone or combination of components illustrated in the exemplary operating environment.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.), or some combination of the two. This most basic configuration is illustrated in FIG. 6 by dashed line 106.

Device 100 may have additional features/functionality. For example, device 100 may include additional storage (removable and/or non-removable) including, but not limited to, magnetic or optical disks or tape. Such additional storage is illustrated in FIG. 6 by removable storage 108 and non-removable storage 110.

Device 100 typically includes a variety of computer readable media. Computer readable media can be any available media that can be accessed by device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable storage medium having computer-readable instructions stored thereon and executed by a processor to:
   assign (i) a first weight to the amount of time since a user first accessed a page of content for making an online purchase, (ii) a second weight to registration status of the user, and (iii) a third weight to an availability of a service representative within a predetermined amount of time;
   determine a user weight based on simultaneously using at least two of the first weight, the second weight, and the third weight, wherein the at least two of the first weight, the second weight, and the third weight are non-zero;
   determine that the user weight exceeds a threshold weight, wherein the threshold weight is a positive number;
   in response to the determination that the user weight exceeds a threshold weight, causing a display of a callback request icon on the page of content being accessed by the user for making the online purchase, the callback request icon being displayed with a name of a particular service representative;
   receive a selection of the callback request icon from the user, and in response:
      capture, from the page of content that the user is accessing, contextual information including content that the user is viewing to make the online purchase, and
      provide the captured contextual information to the particular service representative.

2. The non-transitory computer-readable storage medium of claim 1, further comprising instructions executed to send an alert to a company in response to a determination that the user weight does not exceed the threshold weight, wherein the alert includes the amount of time since the user first accessed the page and information associated with an availability of a service representative.

3. The non-transitory computer-readable storage medium of claim 1, further comprising instructions executed to determine to display the callback request icon based on the amount of time since the user first accessed the page exceeding a predetermined value.

4. The non-transitory computer-readable storage medium of claim 1, wherein the instructions executed to assign the second weight to registration status include instructions executed to determine whether the user has provided login information.

5. The non-transitory computer-readable storage medium of claim 1, wherein the instructions executed to assign the third weight to an availability of a service representative include instructions executed to:
   determine that a service representative is available to service the callback request within a particular amount of time.

6. The non-transitory computer-readable storage medium of claim 1, further comprising instructions executed to submit a request for a callback in response to receiving the selection of the callback request icon.

7. The non-transitory computer-readable storage medium of claim 1, further comprising instructions executed to retrieve a previously stored phone number of the user and cause a display of the previously stored phone number to the particular service representative.

8. The non-transitory computer-readable storage medium of claim 1, further comprising instructions executed to:
   provide a number selection window to the user; and
   cause a display of a user selected number from the number selection window to the particular service representative.

9. The non-transitory computer-readable storage medium of claim 1, wherein the instructions executed to provide the captured context information include instructions executed to provide user entered content including a brief explanation of a reason for the callback.

10. The non-transitory computer-readable storage medium of claim 1, wherein the instructions executed to provide the captured context information include instructions executed to provide user entered content including at least one of a comment input by the user and a question input by the user.

11. The non-transitory computer-readable storage medium of claim 1, further comprising instructions executed to request the user to leave a co-browse window open.

12. The non-transitory computer-readable storage medium of claim 1, further comprising instructions executed to place a callback request notification in an outbound directory in response to receiving the selection of the callback request icon from the user.

13. A non-transitory computer-readable storage medium having computer-readable instructions stored thereon and executed by a processor to:
   determine to display a callback request icon on a page of content being accessed by a user for making an online purchase based on a determination that a user weight exceeds a threshold weight, the user weight being determined based on simultaneously using at least two of:
      a first weight assigned to an amount of time since the user first accessed the page,
      a second weight assigned to registration status of the user, and a third weight assigned to an availability of a service representative within a predetermined amount of time, wherein the at least two of the first weight, the second weight, and the third weight are non-zero, and wherein the threshold weight is a positive number;

in response to the determination, causing a display of the callback request icon on the page, the callback request icon being displayed with a name of a particular service representative;

receive a selection of the call back request icon from the user; and in response to receiving the selection:

capture, from the page of content that the user is accessing, contextual information including content that the user is viewing to make the online purchase, and provide the captured contextual information to the particular service representative.

14. The non-transitory computer-readable storage medium of claim 13, further comprising instructions executed to utilize a contact routing engine to determine if the particular service representative is available to answer the callback request.

15. The non-transitory computer-readable storage medium of claim 13, further comprising instructions executed to utilize a rules engine comprising rules, condition, and circumstances to determine to display the callback request icon.

16. The non-transitory computer-readable storage medium of claim 13, further comprising instructions executed to reserve a service representative in response to the user selecting the callback request icon.

17. The non-transitory computer-readable storage medium of claim 13, further comprising instructions executed to monitor a call status of a plurality of callback requests, including a callback request notification.

18. A computer-implemented method comprising:

assigning, by at least one processor, (i) a first weight to the amount of time since a user first accessed a page of content for making an online purchase, (ii) a second weight to registration status of the user, and (iii) a third weight to an availability of a service representative within a predetermined amount of time;

determining, by the at least one processor, a user weight based on simultaneously using at least two of the first weight, the second weight, and the third weight, wherein the at least two of the first weight, the second weight, and the third weight are non-zero;

determining, by the at least one processor, that the user weight exceeds a threshold weight, wherein the threshold weight is a positive number;

in response to the determination that the user weight exceeds a threshold weight, causing a display of a callback request icon on the page of content being accessed by the user for making the online purchase;

receiving a selection of the callback request icon from the user, and in response:

capturing, from the page of content that the user is accessing, contextual information including content that the user is viewing to make the online purchase, and providing the captured contextual information to the particular service representative.

\* \* \* \* \*